(12) United States Patent
Zlotnick et al.

(10) Patent No.: US 9,217,660 B2
(45) Date of Patent: *Dec. 22, 2015

(54) SURFACE MAPPING BY VIRTUAL ARRAY PROCESSING VIA SEPARATE TRANSMISSIONS

(71) Applicant: A.P.M. AUTOMATION SOLUTIONS LTD., Tel-Aviv (IL)

(72) Inventors: Yossi Zlotnick, Ramat Hasharon (IL); Avishai Bartov, Hod-Hasharon (IL)

(73) Assignee: A.P.M. AUTOMATION SOLUTIONS LTD., Tel Aviv (IL)

( * ) Notice: Subject to any disclaimer, the term of this patent is extended or adjusted under 35 U.S.C. 154(b) by 232 days.

This patent is subject to a terminal disclaimer.

(21) Appl. No.: 13/845,169

(22) Filed: Mar. 18, 2013

(65) Prior Publication Data

US 2014/0208845 A1  Jul. 31, 2014

Related U.S. Application Data (60) Provisional application No. 61/758,297, filed on Jan. 30, 2013.

(51) Int. Cl.
| | | |
|---|---|---|
| G01N 23/00 | (2006.01) |
| G01F 23/296 | (2006.01) |
| G01F 22/00 | (2006.01) |
| G01F 23/00 | (2006.01) |
| G01F 23/284 | (2006.01) |
| G01S 3/46 | (2006.01) |
| G01S 3/808 | (2006.01) |
| G01S 13/00 | (2006.01) |
| G01S 13/42 | (2006.01) |
| G01S 13/88 | (2006.01) |
| G01S 15/00 | (2006.01) |

(Continued)

(52) U.S. Cl.
CPC .............. *G01F 23/296* (2013.01); *G01F 22/00* (2013.01); *G01F 23/0069* (2013.01); *G01F 23/284* (2013.01); *G01F 23/2962* (2013.01); *G01S 3/46* (2013.01); *G01S 3/808* (2013.01); *G01S 13/003* (2013.01); *G01S 13/42* (2013.01); *G01S 13/88* (2013.01); *G01S 15/003* (2013.01); *G01S 15/42* (2013.01); *G01S 15/88* (2013.01); *G01S 7/52006* (2013.01)

(58) Field of Classification Search
None
See application file for complete search history.

(56) References Cited

U.S. PATENT DOCUMENTS 3,720,950 A * 3/1973 Vehrs, Jr. ...................... 342/162
4,145,914 A * 3/1979 Newman ..................... 73/290 V

(Continued)

*Primary Examiner* — Andre Allen
(74) *Attorney, Agent, or Firm* — Reches Patents (57) ABSTRACT

A system for measuring the height of bin contents includes transmitters for transmitting pulses of wave energy towards the upper surface of the contents and receivers for receiving echoes of the pulses and producing corresponding signals. The transmitters and receivers are distributed aerially above the contents. The system also includes a processing apparatus, for using the received signals to map the upper surface, that includes correlators that correlate pulse waveforms with the signals, and a beamformer. In one embodiment, the beamformer computes, from the signals considered as corresponding to echoes, of pulses from fewer synthetic transmitters, received at a synthetic receiver array, respective directions of arrival of the signals. In another embodiment, the beamformer computes respective directions of transmission and arrival of the signals, and the processing apparatus also includes a processor that selects, according to the computed transmission and arrival directions, which signals to use for the mapping.

22 Claims, 7 Drawing Sheets

(51) Int. Cl.
    *G01S 15/42*     (2006.01)
    *G01S 15/88*     (2006.01)
    *G01S 7/52*     (2006.01)

(56) References Cited

U.S. PATENT DOCUMENTS

| | | | |
|---|---|---|---|
| 4,254,482 A * | 3/1981 | Newman | 367/87 |
| 4,984,449 A * | 1/1991 | Caldwell et al. | 73/49.2 |
| 5,060,484 A * | 10/1991 | Bush et al. | 62/137 |
| 5,164,731 A * | 11/1992 | Borden et al. | 342/26 B |
| 5,184,510 A * | 2/1993 | Rossman | 73/290 V |
| 5,303,585 A * | 4/1994 | Lichte | 73/290 V |
| 5,319,974 A * | 6/1994 | Lenz et al. | 73/290 V |
| 5,586,085 A * | 12/1996 | Lichte | 367/99 |
| 5,734,346 A * | 3/1998 | Richardson et al. | 342/124 |
| 6,053,041 A * | 4/2000 | Sinha | 73/290 V |
| 6,700,503 B2 | 3/2004 | Masar et al. | |
| 6,935,177 B2 | 8/2005 | Wall et al. | |
| 7,334,470 B1 | 2/2008 | Bartoli et al. | |
| 8,091,421 B2 | 1/2012 | Perl et al. | |
| 8,276,444 B2 | 10/2012 | Malinovskiy et al. | |
| 2004/0173021 A1* | 9/2004 | Lizon et al. | 73/290 V |
| 2007/0169549 A1* | 7/2007 | Kwun et al. | 73/290 V |
| 2009/0007627 A1* | 1/2009 | Perl et al. | 73/1.73 |
| 2011/0166805 A1 | 7/2011 | Hammer et al. | |

* cited by examiner

SURFACE MAPPING BY VIRTUAL ARRAY PROCESSING VIA SEPARATE TRANSMISSIONS

This patent application claims priority from U.S. Provisional Patent Application No. 61/758,297, filed Jan. 30, 2013

FIELD AND BACKGROUND OF THE INVENTION

The present invention relates to monitoring of inventory and to process measurement, and, more particularly, to a system and method for measuring the content of a bin.

The monitoring of liquid inventory generally is straightforward. By contrast, the monitoring of bulk solid inventory that consists of particulates piled up inside a bin such as a silo often is very difficult. Examples of such bulk solid inventory include cement and sand for construction, grain, fertilizer, etc. The measurement of the level of bulk materials inside a bin is a problem that has not yet been solved adequately. The conditions inside bins typically are unfavorable (dust, extreme temperatures, etc.) and the contents of the bulk material stored in the bins often do not have a flat surface and are not always isotropic. Other difficulties arises from the wide variety of bin shapes in use and from the explosive atmospheres inside some bins.

The scope of the term "bin" as used herein includes any storage container, for bulk particulate solids, whose structure defines an interior volume for receiving and storing the solids. Such a bin may be closed above, below and on all sides, as is the case when the bin is a silo, vessel or tank, or may be open above or on one or more sides. The example of a "bin" that is used in the detailed description of the present invention below is a silo; but it will be obvious to those skilled in the art how to apply the principles of the present invention to any type of bin.

Five principal methods are known for continuous measurement of the content of a bin such as a silo.

An electromechanical (yo-yo) level sensor consists essentially of a weight at one end of a reel of tape. The weight is allowed to descend in the silo to the depth at which the top surface of the content is situated. When the weight settles on top of the content, the tension in the tape slackens. The weight then is retracted to the top set point. The height of the content is inferred from the time required to retract the weight or from the measured tape length.

Mechanical devices such as yo-yo sensors are unreliable. They tend to get clogged by dust and to get stuck on obstacles such as pumps and rods inside the silos.

Ultrasonic level sensors work on the principle of sound wave transmission and reception. High frequency sound waves from a transmitter are reflected by the top surface of the content to a receiver. The height of the content is inferred from the round-trip travel time. Such sensors have limited range and work poorly in the presence of dust. In addition, such devices need to be custom-designed for different types of silo.

Radar level sensors work on the principle of electromagnetic wave transmission and reception. Electromagnetic waves from a transmitter are reflected by the top surface of the content to a receiver. The height of the content is inferred from the round-trip travel time. Such sensors are complex and expensive.

Capacitance sensors measure the capacitance between two metallic rods or between a metallic rod and the ground. Because the silo content has a different dielectric constant than air, the capacitance changes according to the level of the top surface of the content between the two rods or between a rod and the ground. Such sensors tend to be inaccurate and are sensitive to humidity and to type of material stored in the silo.

All the prior art sensors discussed above are insensitive to the shape of the contents, and so are inaccurate in the presence of a common phenomenon called "coning" that occurs as bulk particulate solids are withdrawn via the base of a bin: an inverted conical hole, whose apex is directly above the point of withdrawal, tends to form in the bulk particulate solids. A similar phenomenon occurs as bulk particulate solids are added to a bin from the top: the solids tend to pile up in a cone whose apex is directly below the point of insertion of the solids. These sensors also work poorly in bins with complicated geometries and in the presence of obstacles.

A weight gauge measures the weight of a mobile silo and its content by measuring the tension in the rods that hold the silo. Installation of such gauges is complex, and they are suitable only for mobile silos with metallic legs.

There is thus a widely recognized need for, and it would be highly advantageous to have, a method of measuring the content of a bin such as a silo that would overcome the disadvantages of presently known methods as described above. In particular, it is not known in the prior art to map the upper surface of the bin contents in three dimensions.

SUMMARY OF THE INVENTION

According to the present invention there is provided a system for measuring a height of a content of a bin, including: (a) a plurality of transmitters for transmitting respective pulses of wave energy towards an upper surface of the content; and (b) a plurality of receivers for receiving an echo of each pulse, each receiver producing a respective signal in response to the echo; wherein the transmitters and receivers are distributed aerially above the content, the system further including (c) a processing apparatus, for jointly transforming the signals into a plurality of measured distances from the receivers to the upper surface, that includes: (i) for each receiver, a correlator for correlating a waveform of each pulse with the respective signal, thereby producing a correlated signal, and (ii) a beamformer for computing, from the correlated signals considered as corresponding to echoes, of pulses transmitted by synthetic transmitters that are fewer in number than the plurality of transmitters, that are received by an array of synthetic receivers, a respective direction of arrival of each correlated signal from the upper surface to the receiver of the correlated signal.

According to the present invention there is provided a method of measuring a height of a content of a bin, including: (a) positioning a plurality of transmitters and a plurality of receivers aerially above the contents; (b) transmitting, from each transmitter, a respective pulse of wave energy towards an upper surface of the content; (c) receiving an echo of each pulse, using the receivers, each receiver producing a respective signal in response to the echo; and (d) jointly transforming the signals into a plurality of measured distances from the receivers to the upper surface by steps including: (i) for each receiver and each pulse, correlating a waveform of the each pulse with the signal, thereby producing a correlated signal, (ii) computing, from the correlated signals considered as corresponding to echoes, of pulses transmitted by synthetic transmitters that are fewer in number than the plurality of transmitters, that are received by an array of synthetic receivers, a respective direction of arrival of each correlated signal from the upper surface to the array, and for each direction of arrival, computing a respective the measured distance.

According to the present invention there is provided a system for measuring a height of a content of a bin, including:

(a) a plurality of transmitters for transmitting respective pulses of wave energy towards an upper surface of the content; and (b) a plurality of receivers for receiving at least one echo of each pulse, each receiver producing, in response to each echo, a respective signal; wherein the transmitters and receivers are distributed aerially above the content, the system further including: (c) a processing apparatus, for transforming the signals into a plurality of locations on the upper surface, that includes: (i) for each receiver, a correlator for correlating a waveform of each pulse with each respective at least one signal, thereby producing at least one respective correlated signal, (ii) a beamformer for computing, from the correlated signals, a respective direction of transmission and a respective direction of arrival of each correlated signal, and (iii) a processor for: (A) selecting, from among the correlated signals, according to the directions of transmission and the directions of arrival, only the correlated signals that represent direct echoes from the upper surface, and (B) computing the locations from the selected correlated signals.

According to the present invention there is provided a method of measuring a height of a content of a bin, including: (a) positioning a plurality of transmitters and a plurality of receivers aerially above the contents; (b) transmitting, from each transmitter, a respective pulse of wave energy towards an upper surface of the content; (c) receiving at least one echo of each pulse, using the receivers, each receiver producing a respective signal in response to each echo; and (d) transforming the signals into a plurality of locations on the upper surface by steps including: (i) for each receiver and each pulse, correlating a waveform of the each pulse with each respective at least one signal, thereby producing at least one respective correlated signal, (ii) computing, from the correlated signals, a respective direction of transmission and a respective direction of arrival of each correlated signal, (iii) selecting, from among the correlated signals, according to the directions of transmission and arrival, only the correlated signals that represent direct echoes from the upper surface, and (iv) computing the locations from the selected correlated signals.

One basic system of the present invention, for measuring the height of the contents of a bin, includes a plurality of transmitters for transmitting respective pulses of wave energy towards the upper surface of the contents and a plurality of receivers for receiving an echo of each pulse. Each receiver produces a respective signal in response to each received echo. The transmitters and the receivers are distributed aerially, i.e., not all on the same line, so that the system can map the upper surface of the contents in two dimensions. The system also includes a processing apparatus for jointly transforming the signals into a plurality of measured distances from the receivers to the upper surface. The processing apparatus includes, for each receiver, a correlator for correlating a waveform of each pulse with its respective signal at that receiver, thereby producing a correlated signal. The processing apparatus also includes a beamformer for computing, from the correlated signals, a respective direction of arrival, of each correlated signal, from the upper surface to the receiver of that correlated signal. The directions of arrival are computed as though the correlated signals correspond to echoes, of pulses that are transmitted by synthetic transmitters that are fewer in number (and preferably only a single such synthetic transmitter), that are received by an array of synthetic receivers.

In some embodiments, the wave energy is acoustic energy, and, preferably, the system also includes a thermometer for measuring the interior temperature of the bin. The processing apparatus bases the transforming, of the signals into the measured distances, on the measured interior temperature.

In other embodiments, the wave energy is electromagnetic energy.

Preferably, the processing apparatus also is operative to compute, for each direction of arrival, a corresponding measured distance.

Preferably, some or all of the receivers are transducers that also function as some or all of the transmitters.

Preferably, the transmitters transmit the pulses sequentially. Most preferably, after one pulse has been transmitted by one of the transmitters, the transmission of the next pulse by another transmitter is delayed until the echo of the first pulse has been received by all the receivers.

Alternatively, all the transmitters transmit some or all of the pulses simultaneously.

Preferably, the measured distances are to a plurality of locations on the upper surface of the contents.

Preferably, the processing apparatus is operative to form a Cartesian product of the transmitters and the receivers, thereby forming a synthetic array for which the beamformer computes the directions of arrival.

Another basic system of the present invention, for measuring the height of the contents of a bin, includes a plurality of transmitters for transmitting respective pulses of wave energy towards the upper surface of the contents and a plurality of receivers for receiving an echo of each pulse. Each receiver produces a respective signal in response to each received echo. The transmitters and the receivers are distributed aerially, i.e., not all on the same line, so that the system can map the upper surface of the contents in two dimensions. The system also includes a processing apparatus for transforming the signals into a plurality of locations on the upper surface. The processing apparatus includes, for each receiver, a correlator for correlating a waveform of each pulse with its respective signal at that receiver, thereby producing a correlated signal. The processing apparatus also includes a beamformer for computing, from the correlated signals, a respective direction of transmission and a respective direction of arrival, of each correlated signal. The processing apparatus also includes a processor for selecting, from among the correlated signals and according to the directions of transmission and arrival, only the correlated signals that represent direct echoes from the upper surface of the contents, and for then computing the locations from the selected correlated signals.

In some embodiments, the wave energy is acoustic energy, and, preferably, the system also includes a thermometer for measuring the interior temperature of the bin. The processing apparatus bases the transforming, of the signals into the measured distances, on the measured interior temperature.

In other embodiments, the wave energy is electromagnetic energy.

Preferably, some or all of the receivers are transducers that also function as some or all of the transmitters.

Preferably, the transmitters transmit the pulses sequentially. Most preferably, after one pulse has been transmitted by one of the transmitters, the transmission of the next pulse by another transmitter is delayed until the echo of the first pulse has been received by all the receivers.

Alternatively, all the transmitters transmit some or all of the pulses simultaneously.

The scope of the present invention also includes the methods used by the systems to measure the height of the bin contents.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a system for measuring the quantity of material stored in a bin such as a silo. Specifically, the present invention can be used to monitor inventory in a silo.

The principles and operation of content measuring according to the present invention may be better understood with reference to the drawings and the accompanying description.

Figure 1:
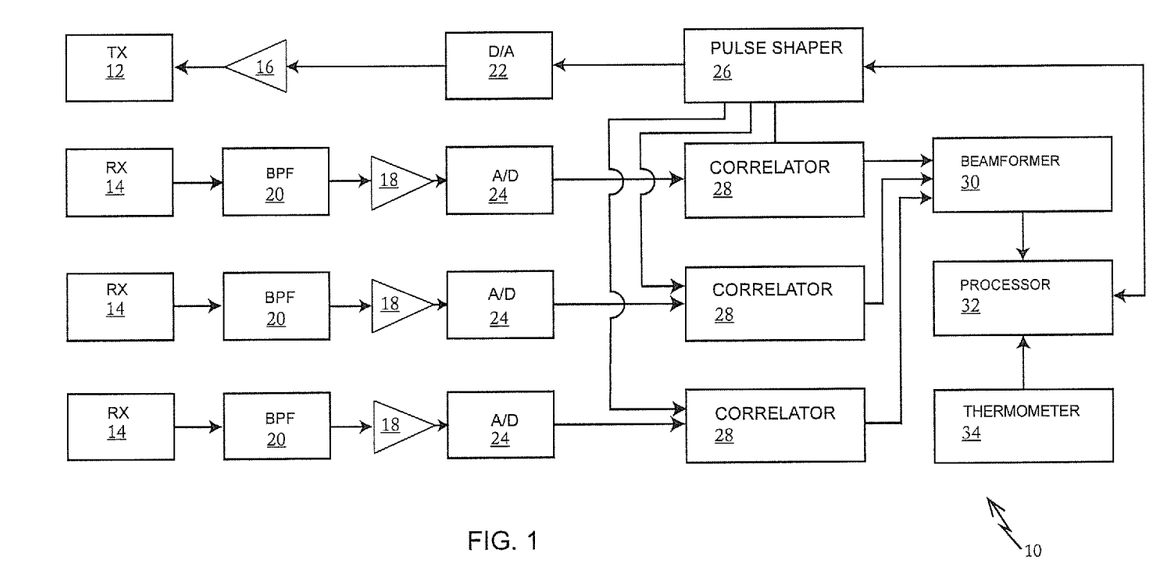
FIG. 1 is a high-level schematic functional block diagram of a system of the present invention.

Referring now to the drawings, FIG. 1 is a high-level schematic functional block diagram of a system 10 of the present invention. The arrows in FIG. 1 indicate the direction of signal flow. System 10 includes an acoustic transmitter (speaker) 12 and three acoustic receivers (microphones) 14. A pulse shaper 26 synthesizes digital pulse forms as described below. The digital pulse forms are converted to analog electrical pulses by a D/A converter 22 and amplified by an amplifier 16. The amplified analog electrical pulses are converted to audio pulses by transmitter 12. Echoes of these audio pulses are received and converted to analog electrical signals by receivers 14, filtered by bandpass filters 20 that preferably are matched to the shape of the audio pulses, amplified by amplifiers 18 and sampled by A/D converters 24 to provide corresponding digital signals. The digital signals are correlated with the corresponding digital pulse forms by correlators 28. The directions of arrival of the correlated signals are computed by a beamformer 30. A processor 32 converts the correlated signals into corresponding round-trip acoustic travel times and then converts those travel times, with the help of a temperature measurement obtained by a digital thermometer 34, into estimated travel distances along the directions of arrival.

Figure 2:
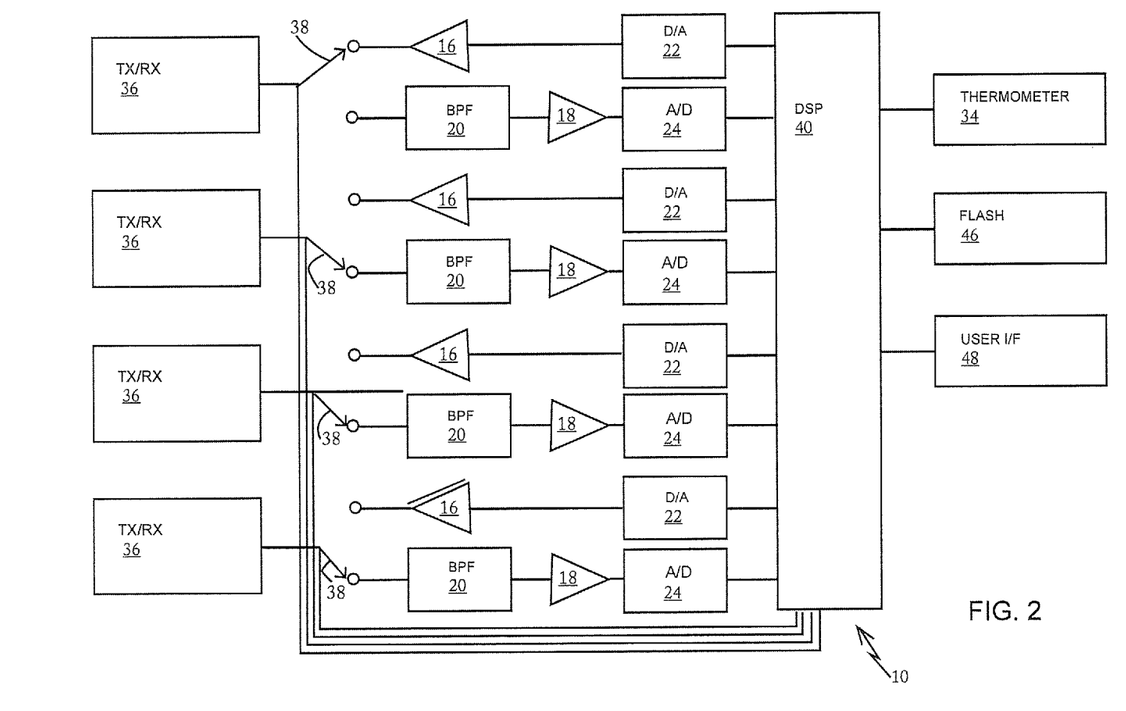
FIG. 2 is a schematic block diagram of a preferred physical embodiment of the system of FIG. 1.

FIG. 2 is a schematic block diagram of a preferred physical embodiment of system 10. In the embodiment illustrated in FIG. 2, the functions of transmitter 12 and receivers 14 are shared by transceivers 36. Each transceiver 36 operates as either transmitter 12 or one of receivers 14 depending on the setting of a respective switch 38. The digital functionality of system 10 (pulse shaper 26, correlators 28, beamformer 30, processor 32) is implemented by a digital signal processor (DSP) 40 executing code that is stored in a flash memory 46. The results of the processing are displayed at a display in a user interface 48.

DSP 40 cycles the function of transmitter 12 among transceivers 36 by setting switches 38 so that one or more of transceivers 36 functions as transmitter 12 and the other transceivers 36 function as receivers 14. This cycling is done separately for two different purposes. One of the purposes is to measure a set of distances from transceivers 36 towards the top of the content of a silo along beam is synthesized by beamformer 30, as described below. The other purpose is to calibrate transceivers 36 that function as receivers 14 relative to a calibration pulse emitted by transceiver 36 that functions as transmitter 12.

There are two preferred modes of using transceivers 36 as both transmitters and receivers to measure the distances to the top of the contents. In the first mode, all transceivers 36 transmit the same pulse coherently and simultaneously. In the second mode, transceivers 36 alternate in transmitting the pulse. Under both modes, after a pulse is transmitted, all switches 38 are set to their lower positions so that all transceivers 36 function as receivers. Under the second mode, this allows an array of n transceivers to function as a virtual array of $(n^2+n)/2$ virtual receivers. (Using M transmitters and N receivers gives MN independent signals. Using n transceivers alternately as transmitters and receivers reduces the number of independent signals to $(n^2+n)/2$ because of the symmetry of transmitting and receiving with each pair of transceivers.)

The second mode also doubles the effective geometrical array size. The directionality of a receiver array is based on the relative delays of the signals arriving at the receivers. When transmitting from a single transmitter to an array of receivers, the relevant delays are the differences in travel time from the target to the receivers. When alternately transmitting and receiving by an array of transceivers, the relevant delays are the differences in the round-trip travel time, which is twice the travel time from the target to the receiver. Achieving an equivalent directionality using a single transmitter would require doubling the receiver array size.

In other embodiments of system 10, application-specific functionality such as the functionality of pulse shaper 26, correlators 28 and beamformer 30 is implemented in application-specific integrated circuits rather than by a digital signal processor. In yet other embodiments of system 10, a general-purpose computer system is used in place of DSP 40, flash memory 46 and user interface 48.

Figure 3:
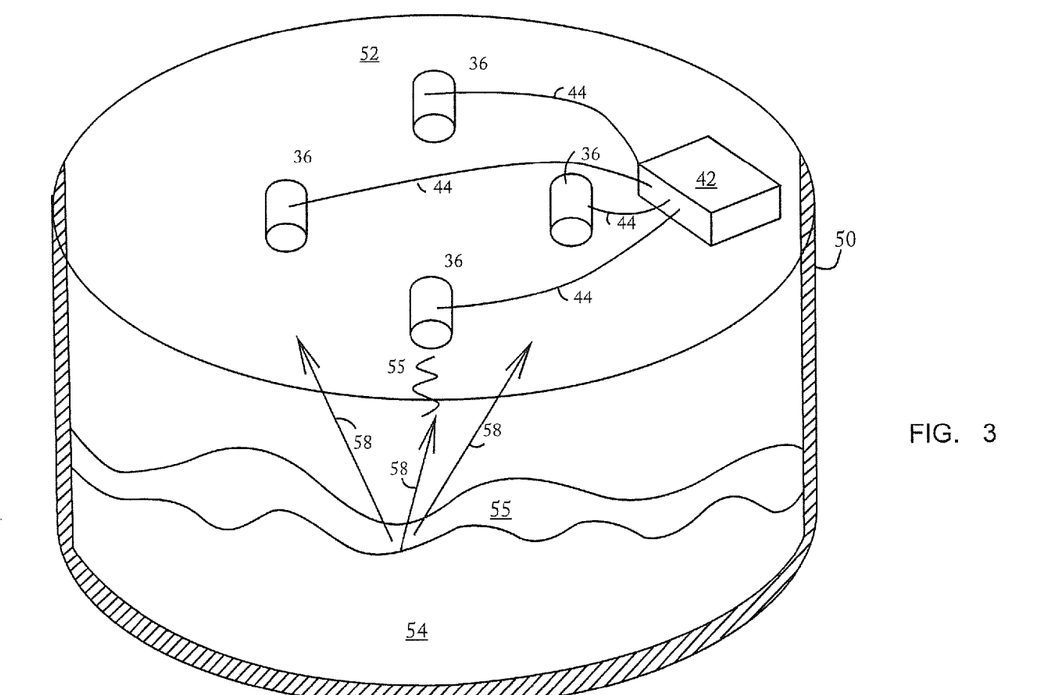
FIG. 3 is a partially cut-away view of a silo with the system of FIG. 1 mounted on the ceiling of the silo.

FIG. 3 is a partially cut-away view of a silo 50 with system 10 mounted on the ceiling 52 of silo 50. Four transceivers 36 are mounted in a square configuration, so that no matter which transceiver 36 serves as transmitter 12 the other three transceivers 36 that serve as receivers 14 are in a non-collinear configuration. The remaining components of system 10 are enclosed in a housing 42 that also is mounted on ceiling 52. Transceivers 36 are operationally connected to the rest of system 10 by wires 44. Transceiver(s) 36 that function(s) as transmitter 12 emit(s) an acoustic pulse 56 towards the upper surface 55 of content 54 of silo 50. Acoustic pulse 56 is represented symbolically in FIG. 3 as a waveform emerging from one of transceivers 36. An echo of acoustic pulse 56 that is reflected from upper surface 55 back towards transceivers 36 is represented in FIG. 3 by arrows 58.

In the specific configuration illustrated in FIG. 3, only a portion of user interface 48 is inside housing 42 and includes a wireless transceiver for communicating with the remainder of user interface 48 at a more convenient location. In an alternative configuration, housing 42 is mounted in a location that is more accessible to the user than ceiling 52.

Echo 58, that is received by transceivers 36 functioning as receivers 14, is transformed to corresponding respective analog electrical signals by transceivers 36. The analog electrical signals are filtered by bandpass filters 20, amplified by amplifiers 18 and converted to corresponding digital signals by A/D converters 24. Correlators 28 correlate these digital signals with the waveform of pulse 56. Beamformer 30 uses known algorithms to compute the directions of arrival of the correlated digital signals and to distinguish signals that arrive directly from upper surface 55 from signals that arrive along other paths (the latter signals constituting deterministic noise in the present context). That transceivers 36 are not collinear allows beamformer 30 to scan upper surface 55 in two dimensions to obtain a three-dimensional map of upper surface 55. The difference in time between the start of the transmission of pulse 56 and the leading edge of a waveform that arrives directly from upper surface 55 is the two-way travel time between the array of transceivers 36 and the patch on upper surface 55 that is sampled by that waveform. Processor 32 multiplies half of this travel time by the speed of sound in the air above upper surface 55 to obtain the distance from the array of transceivers 36 to the sampled patch on upper surface 55. Processor 32 obtains the speed of sound c in meters per second using the relationship $$c = 331.5\sqrt{1 + \frac{T}{273}}$$

where T is the temperature inside silo 50 in degrees Celsius as measured by thermometer 34.

The simplest way for beamformer 30 to compute directions of arrival of incoming signals is to synthesize beams by summing the correlated signals while varying the relative phases (or, equivalently, the relative delays) of the correlated signals, as is known in the art. It is for this reason that beamformer 30 is referred to herein as a "beamformer". Much better results are obtained by using more sophisticated adaptive Direction-Of-Arrival (DOA) algorithms, such as MUltiple Signal Classification (MUSIC), Stochastic Maximum Likelihood (SML), Deterministic Maximum Likelihood (DML) or Estimation of Signal Parameters via Rotational Invariance Techniques (ESPRIT). To overcome the limited ability of these algorithms to estimate several sources simultaneously, and in particular to help these algorithms in distinguishing coherent echoes of pulse 56 that arrive at the array of transceivers 36 from different directions, the received signals are processed separately in overlapping time slices whose length is selected in accordance with the bandwidth of pulse 56. The bandwidth of pulse 56 in turn is selected to achieve the desired resolution of the distance from the array of transceivers 36 to upper surface 55. For example, if pulse 56 has a passband of 3.5 KHz to 4.5 KHz, the distance resolution is approximately 340 m/sec÷1000 sec$^{-1}$÷2=17 cm. The corresponding time slices are about 1 millisecond long (the reciprocal of the pulse bandwidth). The accuracy of the distance measurement also depends on the digitization rate of A/D converters 24 and on the signal-to-noise ratio, and therefore can be much better than the resolution. The preferred sampling rate of 44 KHz gives a potential accuracy, at high S/N, of 340 m/sec÷44,000 sec$^{-1}$÷2=3.8 mm.

The distances from the array of transceivers 36 to several patches on upper surface 55 constitutes a map of upper surface 55. Given the interior geometry of silo 50, it is straightforward to estimate from this map the volume of content 54. Multiplying the volume of content 54 by the density of content 54 gives the mass of content 54.

Figure 4:
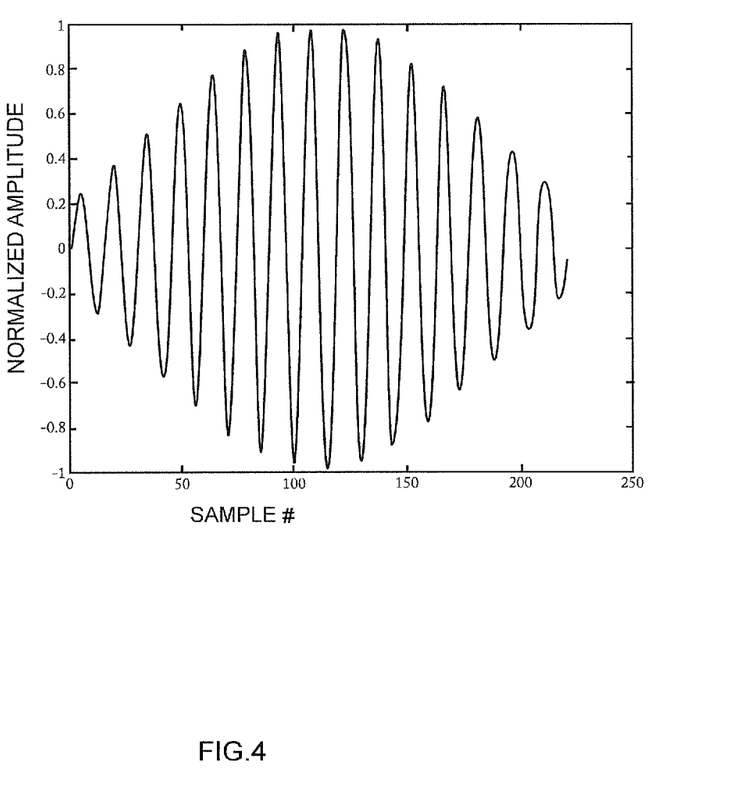
FIG. 4 shows an exemplary pulse shape.

Any suitable pulse shape may be used for pulse 56. FIG. 4 shows one such pulse 56: a 5 millisecond Kaiser pulse modulated at 3 KHz. (The abscissa in FIG. 4 is sample number and the pulse waveform is sampled at 44.1 samples per millisecond.) Pulses also may be shaped by binary phase coding techniques such as Barker coding, as is known from the field of radar. The preferred frequency band of pulse 56 for mapping upper surface 55 in the presence of dust above upper surface 55 is between 3 KHz and 6 KHz.

Figure 5:
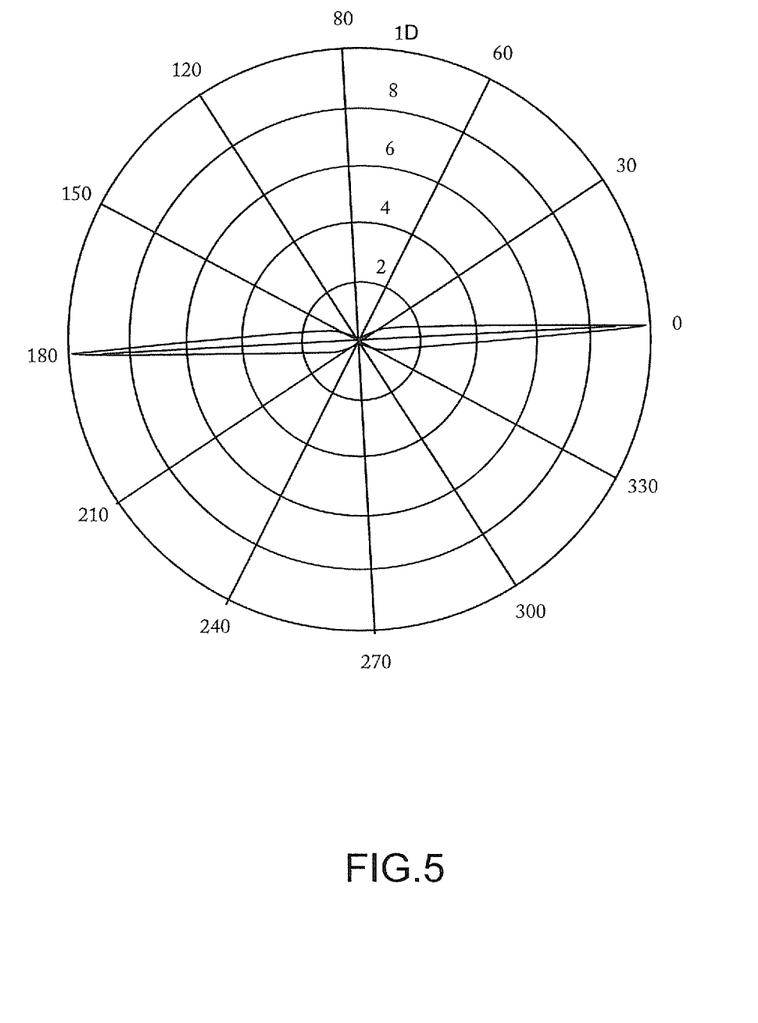
FIG. 5 is a polar plot of the superdirectivity of the present invention.

The angular resolution of the mapping of upper surface 55 is improved by superdirective processing of the correlated signals. See, for example, M. Brandstein and D. Wards (eds.), *Microphone Arrays Signal Processing Techniques and Applications* (Springer, 2001). FIG. 5 is a polar plot of the superdirectivity of two receivers separated by a distance of half a wavelength of the received signal, at a signal-to-noise ratio of 20 dB. It is clear from this plot that the present invention has sufficient angular resolution to map upper surface 55 even in the presence of "coning".

The shape of pulse 56 is set by pulse shaper 26. Preferably, processor 32 optimizes this shape iteratively by manipulating the parameters of the shape of pulse 56. One important parameter is the length (i.e. the duration) of pulse 56. The longer pulse 56, the higher the signal-to-noise ratio; but pulse 56 must not be so long that the trailing edge of pulse 56 overlaps in time with the arrival of echoes 58 at receivers 14, in order for transceivers 36 that transmit pulse 56 to also serve as receivers 14 as described above. Starting with a trial pulse length based on an initial guess of the normal distance from the array of transceivers 36 to upper surface 55, processor 32 varies the pulse length iteratively to optimize the pulse length. With pulse length optimized, the frequency content of pulse 56 is optimized relative to the observed attenuation and observed ambient noise.

Although transceivers 36 are shown in FIG. 3 deployed on ceiling 52 of silo 50, transceivers 36 may be deployed in any convenient location above upper surface 55, for example on the wall of silo 50.

In principle, using only one of transceivers 36 as transmitter 12 suffices to map upper surface 55 because beamformer 30 can scan upper surface 55 by appropriate manipulation of signals from any non-collinear array of receivers 14. It is preferable, however, to obtain measurements using all transceivers 36 alternately as transmitter 12, for the sake of redundancy.

Although the present invention is described above in terms of the transmission and reception of acoustic energy propagating in air, the present invention can be implemented using transmitters and receivers of any kind of wave energy that propagates in a substantially uniform medium, for example, electromagnetic energy, especially in the microwave portion of the electromagnetic spectrum (radar), and most especially in the frequency range 6 GHz to 80 GHz.

Returning now to the subject of DOA algorithms, an innovative DOA method now will be presented that increases the effective array size of a system such as system 10 that includes an array of n>1 transmitters 12 and an array of m>1 receivers 14, disposed non-collinearly so that upper surface 55 can be mapped in two dimensions. The Cartesian coordinates of transmitters 12 are $(x_i^T, y_i^T, z_i^T)$, for $1 \leq i \leq n$. The Cartesian coordinates of receivers 14 are $(x_j^R, y_j^R, z_j^R)$, for $1 \leq j \leq m$. The effective array size is increased by forming the Cartesian product of transmitters 12 and receivers 14, to give a synthetic array of nm synthetic receivers whose coordinates are $(x_i^T + x_j^R, y_i^T + y_j^R, z_i^T + z_j^R)$, and that receive their signals from a single synthetic transmitter. Each synthetic receiver's signal is the signal that the corresponding real receiver 14 (indexed by j) received from the corresponding real transmitter 12 (indexed by i). A conventional DOA algorithm is applied to the signals of the synthetic array by beamformer 30 to obtain the corresponding directions of arrival of echoes 58. Because the DOA algorithm computes only directions of arrival, the algorithm does not need to know the location of the synthetic transmitter that is pretended to have transmitted the signals received by the synthetic receivers. Hence, the coordinates of the synthetic transmitter are arbitrary. It can be shown that the directions of arrival thus calculated for each echo 58 are the same as the directions of arrival of that echo 58 at the corresponding real receivers 14. The methodology discussed above then is used to locate the points on upper surface 55 from which receivers 14 received their echoes.

Figure 6:
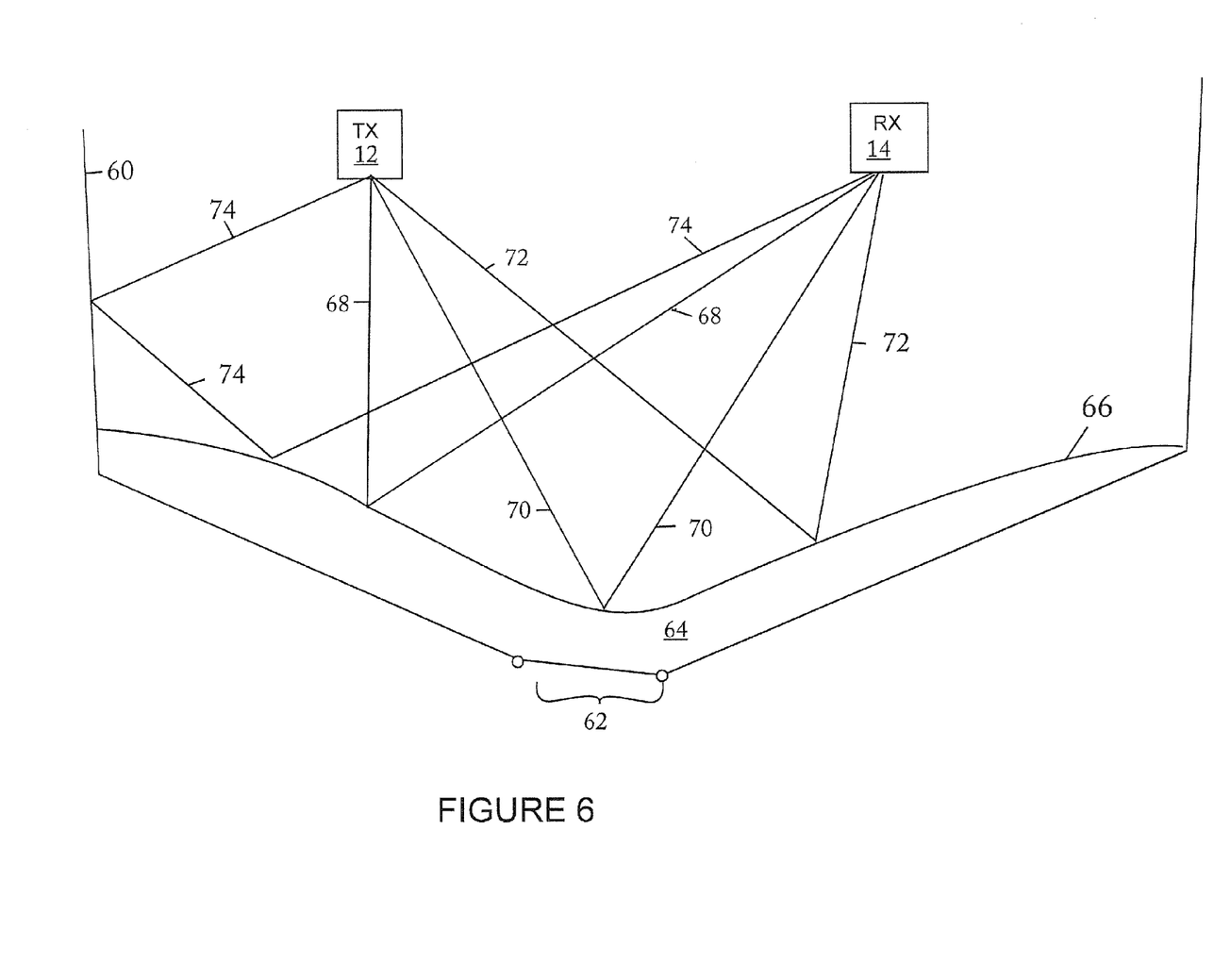
FIG. 6 illustrates multiple direct reflections and multipath.

Another in of the methodology discussed above addresses the problem illustrated in FIG. 6. FIG. 6 shows four raypaths 68, 70, 72 and 74 from a transmitter 12 to a receiver 14 via the upper surface 66 of the granular contents 64 of a hopper 60 that discharges contents 64 through doors 62 in the bottom of hopper 60. Contents 64 in the middle of hopper 60 tend to exit before contents 64 at the sides of hopper 60, leaving a bowl-shaped depression in upper surface 66. Raypaths 68, 70 and 72 are direct reflections from upper surface 66. Raypath 74 is a multipath and should be ignored. Conventionally, only the echo corresponding to the shortest direct raypath 68, 70 or 72, i.e., the echo that arrives first at receiver 14, is used for mapping upper surface 66, and the other two direct echoes, that bear potentially useful information, are ignored.

Conventionally, DOA algorithms are applied to the signals received by an array of receivers 14 from a single transmitter 12. Suppose that there are n>1 transmitters 12 labeled $T_i$, $1 \le i \le n$, and m>1 receivers 14, labeled $R_j$, $1 \le j \le n$, not all co-linear By the principle of reciprocity, the signals received by a single receiver Rj, located at Cartesian coordinates $(x_j R, y_j^R, z_j^R)$, from n transmitters $T_i$ located at Cartesian coordinates $(x_i^T, y_i^T, z_i^T)$, are the same as the signals that would be received by an array of n receivers located at $(x_i^T, y_i^T, z_i^T)$ from a single transmitter located at $(x_j^R, y_j^R, z_j^R)$. Therefore, applying a DOA algorithm to the signals received by a receiver $R_j$ from the n transmitters $T_i$ yields, for each echo received by $R_j$, the direction of transmission of the corresponding pulse. Given, for each (pulse, echo) pair, both its direction of transmission and its direction of arrival, direct echoes can be distinguished from indirect echoes. For example, in FIG. 6, the echoes associated with raypaths 68, 70 and 72 are used for mapping because the directions and lengths of these raypaths indicate that each of these raypaths includes a single reflection and that that reflection is from upper surface 66. The echo associated with raypath 72 is ignored on the grounds that the direction and length of raypath 74 take that raypath in a trajectory that hits the wall of hopper 60. (It is assumed that the DOA algorithm has information about the locations of the walls of hopper 60 and about the positions and orientations of transmitters 12 and receivers 14.)

As in the methodology discussed above, the DOA algorithm typically is executed in beamformer 30.

Figure 7:
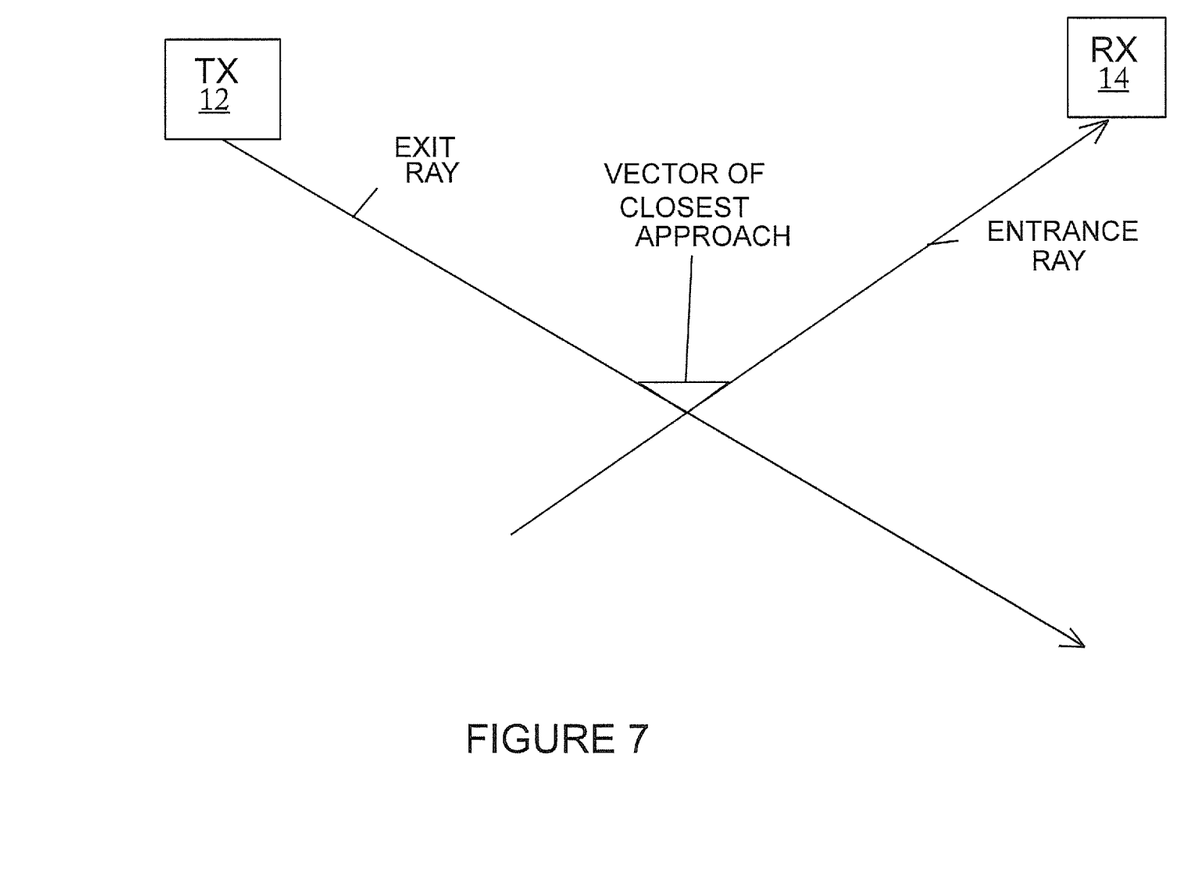
FIG. 7 shows how to map the upper surface of bin contents, given the transmission and arrival directions of a direct echo.

Given the transmission and arrival directions of a direct echo, the associated rays can be used to map upper surface 66 directly. This is illustrated in FIG. 7 that shows an exit ray, from a transmitter 12, in the transmission direction calculated by the DOA algorithm, and an entrance ray, from a receiver 14, in the arrival direction calculated by the DOA algorithm. The two rays in general do not intersect, but it is easy to calculate the coordinates of the two (vectorial) points, $r_T$ on the exit ray and $r_R$ on the entrance ray, where the two rays most closely approach each other. If the length of the vector $r_T - r_R$ is below a predetermined threshold then the half-way point $(r_T + r_R)/2$ is taken as the associated reflection point on upper surface 66.

A sufficiently sophisticated DOA algorithm provides, for each echo, not a single arrival direction, but a probability function $P_R(\theta, \phi)$, of azimuth angle $\theta$ and depression angle $\phi$, such that the probability that the arrival direction is in the solid angle interval $d\theta d\phi$ is $P_R(\theta, \phi) d\theta d\phi$. Thresholding this function provides, rather than a single entrance ray, a bundle of entrance rays that emerge from the associated receiver. A similar bundle of exit rays may be calculated for the associated transmitter, with an associated probability function $P_T(\theta, \phi)$. If the two bundles intersect, the point in the intersection region where the product $P_R(\theta, \phi) P_T(\theta, \phi)$ is maximized is taken as the associated reflection point on upper surface 66.

While the invention has been described with respect to a limited number of embodiments, it will be appreciated that many variations, modifications and other applications of the invention may be made.

What is claimed is:

1. A system for measuring a height of a content of a bin, comprising:
   (a) a plurality of transmitters for transmitting respective pulses of wave energy towards an upper surface of the content; and
   (b) a plurality of receivers for receiving an echo of each said pulse, each said receiver producing a respective signal in response to said echo;
   wherein said transmitters and receivers are distributed aerially above the content, the system further comprising
   (c) a processing apparatus, for jointly transforming said signals into a plurality of measured distances from said receivers to said upper surface, that includes:
      (i) for each said receiver, a correlator for correlating a waveform of each said pulse with said respective signal, thereby producing a correlated signal, and
      (ii) a beamformer for computing, from said correlated signals considered as corresponding to echoes, of pulses transmitted by synthetic transmitters corresponding to said plurality of transmitters, said synthetic transmitters being fewer in number than said plurality of transmitters, that are received by an array of synthetic receivers, said synthetic receivers corresponding to said plurality of receivers, a respective direction of arrival of each said correlated signal from said upper surface to said receiver of said correlated signal.

2. The system of claim 1, wherein said wave energy is acoustic energy.

3. The system of claim 2, further comprising:
   (d) a thermometer for measuring an interior temperature of the bin, said processing apparatus basing said transforming, of said signals into said measured distances, on said measured interior temperature.

4. The system of claim 1, wherein said wave energy is electromagnetic energy.

5. The system of claim 1, wherein said processing apparatus is operative to compute, for each said direction of arrival, a corresponding said measured distance.

6. The system of claim 1, wherein at least a portion of said receivers are transducers that also function as at least a portion of said transmitters.

7. The system of claim 1, wherein said transmitters transmit said pulses sequentially.

8. The system of claim 7, wherein, subsequent to said transmission of one of said respective pulses by one of said transmitters, said transmission of a next said pulse by another one of said transmitters is delayed until said echo of said one pulse has been received by all said receivers.

9. The system of claim 1, wherein said measured distances are to a plurality of locations on said upper surface.

10. The system of claim 1, wherein said processing apparatus is operative to form a Cartesian product of said plurality of transmitters and said plurality of receivers, thereby forming a synthetic array including said synthetic transmitters and said synthetic receivers, said synthetic array for which said beamformer computes said directions of arrival.

11. The system of claim 10, wherein said respective directions of arrival are computed from said correlated signals considered as corresponding to echoes of pulses transmitted by a single said synthetic transmitter.

12. A method of measuring a height of a content of a bin, comprising:
 (a) positioning a plurality of transmitters and a plurality of receivers aerially above the contents;
 (b) transmitting, from each said transmitter, a respective pulse of wave energy towards an upper surface of the content;
 (c) receiving an echo of each said pulse, using said receivers, each said receiver producing a respective signal in response to said echo; and
 (d) jointly transforming said signals into a plurality of measured distances from said receivers to said upper surface by steps including:
  (i) for each said receiver and each said pulse, correlating a waveform of said each pulse with said signal, thereby producing a correlated signal,
  (ii) computing, from said correlated signals, considered as corresponding to echoes, of pulses transmitted by synthetic transmitters corresponding to said plurality of transmitters, said synthetic transmitters being fewer in number than said plurality of transmitters, that are received by an array of synthetic receivers, said synthetic receivers corresponding to said plurality of receivers, a respective direction of arrival of each said correlated signal from said upper surface to said array, and
  (iii) for each said direction of arrival, computing a respective said measured distance.

13. A system for measuring a height of a content of a bin, comprising:
 (a) a plurality of transmitters for transmitting respective pulses of wave energy towards an upper surface of the content; and
 (b) a plurality of receivers for receiving at least one echo of each said pulse, each said receiver producing, in response to each said echo, a respective signal;
 wherein said transmitters and receivers are distributed aerially above the content, the system further comprising:
 (c) a processing apparatus, for transforming said signals into a plurality of locations on said upper surface, that includes:
  (i) for each said receiver, a correlator for correlating a waveform of each said pulse with each said respective at least one signal, thereby producing at least one respective correlated signal,
  (ii) a beamformer for computing, from said correlated signals, a respective direction of transmission and a respective direction of arrival of each said correlated signal, and
  (iii) a processor for:
   (A) selecting, from among said correlated signals, according to said directions of transmission and said directions of arrival, only said correlated signals that represent direct echoes from said upper surface, and
   (B) computing said locations from said selected correlated signals.

14. The system of claim 13, wherein said wave energy is acoustic energy.

15. The system of claim 14, further comprising:
 (d) a thermometer for measuring an interior temperature of the bin, said processing apparatus basing said transforming, of said signals into said locations, on said measured interior temperature.

16. The system of claim 13, wherein said wave energy is electromagnetic energy.

17. The system of claim 13, wherein at least a portion of said receivers are transducers that also function as at least a portion of said transmitters.

18. The system of claim 13, wherein said transmitters transmit said pulses sequentially.

19. The system of claim 18, wherein, subsequent to said transmission of one of said respective pulses by one of said transmitters, said transmission of a next said pulse by another one of said transmitters is delayed until said at least one echo of said one pulse has been received by all said receivers.

20. The system of claim 13, wherein said transmitters transmit at least a portion of said pulses simultaneously.

21. A method of measuring a height of a content of a bin, comprising:
 (a) positioning a plurality of transmitters and a plurality of receivers aerially above the contents;
 (b) transmitting, from each said transmitter, a respective pulse of wave energy towards an upper surface of the content;
 (c) receiving at least one echo of each said pulse, using said receivers, each said receiver producing a respective signal in response to each said echo; and
 (d) transforming said signals into a plurality of locations on said upper surface by steps including:
  (i) for each said receiver and each said pulse, correlating a waveform of said each pulse with each said respective at least one signal, thereby producing at least one respective correlated signal,
  (ii) computing, from said correlated signals, a respective direction of transmission and a respective direction of arrival of each said correlated signal,
  (iii) selecting, from among said correlated signals, according to said directions of transmission and arrival, only said correlated signals that represent direct echoes from said upper surface, and
  (iv) computing said locations from said selected correlated signals.

22. The system of claim 12, wherein the correspondence of: i) said synthetic transmitters to said plurality of transmitters, and, ii) said synthetic receivers to said plurality of receivers, is based on a Cartesian product of said plurality of transmitters and said plurality of receivers.

* * * * *